United States Patent [19]
Ben-Natan

[11] 3,708,060
[45] Jan. 2, 1973

[54] RIGID CURVED SHEET ELEMENTS, SUCH AS SCREW CONVEYOR BLADES, AND METHODS OF MAKING SAME

[75] Inventor: Daniel Ben-Natan, 27 Hanarkisim Street, Kiryat Bialik, Israel

[22] Filed: June 26, 1970

[21] Appl. No.: 50,091

[30] Foreign Application Priority Data

July 3, 1969   Israel ..........................32511/69

[52] U.S. Cl.................................72/379, 29/156.8
[51] Int. Cl. ............................................B21d 11/06
[58] Field of Search .........29/156.8; 198/213; 72/379

[56] References Cited

UNITED STATES PATENTS

| | | | |
|---|---|---|---|
| 2,437,259 | 3/1948 | Kautz | 29/156.8 |
| 106,627 | 8/1870 | Skelly | 198/213 |
| 1,023,888 | 4/1912 | Sorensen | 198/213 |

Primary Examiner—Lowell A. Larson
Attorney—Benjamin J. Barish

[57] ABSTRACT

A rigid curved sheet element, such as a helicoidal screw conveyor blade, is curved by being formed with a series of triangular segments bounded along their sides and alternately disposed so that their apexes alternate from one edge (the longer side) of the sheet element to the opposite edge (the shorter side); in addition the plane of each triangular segment forms an obtuse angle with respect to that of the next succeeding one, and alternates in direction with respect to successive ones. In a preferred method of making same, a flat sheet blank, preferably in the shape of a circle, is bent along a plurality of lines in alternate directions to form the triangular segments. In another method, a plurality of separate triangular segments are fixed together, as by welding, to form the curved sheet element.

4 Claims, 9 Drawing Figures

PATENTED JAN 2 1973 3,708,060

Inventor
DANIEL BEN-NATHAN
by *Benjamin J. Daniel*
Attorney

RIGID CURVED SHEET ELEMENTS, SUCH AS SCREW CONVEYOR BLADES, AND METHODS OF MAKING SAME

BACKGROUND OF THE INVENTION

1. Field Of The Invention

The present invention relates to rigid curved sheet elements, particularly screw conveyor blades, and to methods of making same.

2. Description of The Prior Art

Screw conveyor blades are helicoidal in shape and are usually produced by first preparing a flat circular blank, e.g. of steel, with a central circular opening and a radial slot, and then forcing apart the edges of the blank bordering the radial slot in an axial direction to form one convolution of the helicoid. A plurality of helicoids so formed are then fixed together, as by welding, to form the complete helicoid blade, which blade is fixed to a central shaft. Because of the large axial force required in this method, heavy and expensive equipment is needed, and moreover the conveyor blades that may be produced are limited both in diameter and in thickness. In addition, with this method there is a possibility of producing an unsatisfactory non-uniform bend in the blank particularly with blanks of large diameter and/or thickness, which is another limiting factor in the size and thickness of the elements capable of being produced by this method.

Another method used today is to take a long sheet and to spiral it, like a spring, but this method is used only for blades of small diameter and thickness.

SUMMARY OF THE PRESENT INVENTION

The present invention aims to provide new forms of rigid curved sheet elements, such as screw conveyor blades, and to methods of making same, which methods do not require the heavy and expensive equipment needed in the presently-used ones, and which methods are also not limited in the size or thickness of blade produced by it. The methods of the present invention enable small installations having conventional working equipment to produce screw conveyor blades of virtually unlimited size and thickness. While the present invention is particularly adapted for making helicoidal screw conveyor blades, it can be used in making blades of other curved shaped and other forms of curved sheet elements, such as rotary fan or pump vanes.

According to one aspect of the invention, there is provided a method of making a rigid curved sheet element, characterized in preparing a flat sheet blank having a pair of opposed edges one of which is longer than the other, defining a longer-edge side of the blank and a shorter-edge side of the blank, and bending said sheet along a plurality of lines and in alternate directions for successive lines to form a series of consecutive triangular segments bounded along their sides and alternately disposed so that their apexes alternate from the longer-edge side of the blank to the shorter-edge side of the blank, the plane of each triangular segment so formed making an obtuse angle with respect to that of the next succeeding one.

In the preferred embodiment of the invention described below, the flat sheet blank is substantially in the shape of a circle or a segment thereof and includes a substantially circular central opening or part thereof. The outer circular edge of the blank thus constitutes the longer-edge side, and the inner circular edge of the blank constitutes the shorter-edge side.

By making the outer and inner edges exactly circular, a helicoid may be produced having a constant outer and inner diameter. However, the outer and/or inner edge of the blank may be shaped not exactly as a circle (or part thereof), e.g. spiral-shaped, whereby the respective diameter of the helicoid will be conical.

The improved curved sheet elements produced by the foregoing method have a number of important advantages in addition to the fact that they may be made with conventional working equipment and virtually of unlimited size and thickness. Thus, the bending steps produce cold-working hardening of the sheet element, and the bends themselves further increase the strength of the produced curved elements in that they act like strenghtening ribs. In addition, and particularly when screw conveyor blades are produced by the method, the flat triangular segments in the blade increase the effective friction between the blade and the material being conveyed thereby, as compared to the presently-used continuously-curved blades, thereby increasing the volumetric capacity of the conveyor.

Further features and advantages of the invention will be apparent from the description below.

BRIEF DESCRIPTION OF THE DRAWINGS

The invention is herein described, somewhat diagrammatically and by way of example only, with reference to the accompanying drawings, wherein.

DESCRIPTION OF THE PREFERRED EMBODIMENTS

Figure 1:
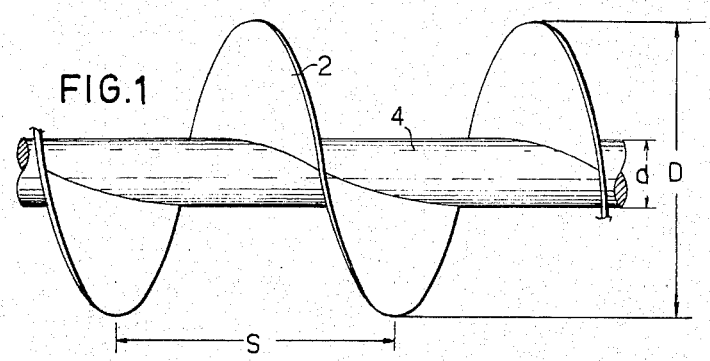
FIG. 1 illustrates a helicoidal screw conveyor blade adapted to be produced by the present invention.

FIG. 1 illustrates a conventional screw conveyor blade 2 of helicoidal shape fixed to a shaft 4. In the conventional screw conveyor, the conveyor blade 2 and shaft 4 are usually disposed in a trough (not shown) through which the material being conveyed is moved by rotation of the shaft and blade. The lead of the helix is designated S, its external diameter D, and its internal diameter d.

Figure 2:
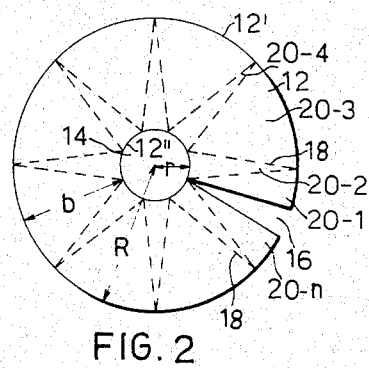
FIG. 2 illustrates a flat sheet blank that may be used in the method of the present invention.

Such a blade is usually made by taking a flat, circular, sheet blank, such as that illustrated at 12 in FIG. 2, formed with a central circular opening 14 and a radial slot 16, and forcing the ends of the blank apart in an axial direction to form a helicoid of one convolution. A plurality of convolutions formed in this manner are then welded to each other and to shaft 4 to form the helicoid blade 2. As indicated earlier, this method requires large and expensive equipment to produce the axial force necessary for bending the blank to form the helicoid curve; moreover it is limited, because of the force required and the possibility of non-uniform bending, in the diameter and thickness of blades capable of being produced by it.

According to the preferred method of the present invention described herein, there is first produced the same type of flat, round sheet blank 12 shown in FIG. 2, having a central opening 14 and a radial slot 16. However, instead of forcing the ends of the sheet axially apart by brute force to produce the helicoid curve, the sheet is bent along a plurality of transverse lines 18, and in alternate directions for successive lines, to form a series of consecutive triangular segments 20-1, 20-2, 20-3, 20-4–20-n, as shown in FIG. 2. Conventional bending apparatus can be used since only straight-line bends of an obtuse angle (more fully described below) are produced. It will be seen that the produced triangular segments are all bounded along their sides and are disposed so that their apexes alternate from the outer circular edge 12' (constituting the longer-edge side) of the blank, to the inner circular edge 12" (constituting the shorter-edge side) of the blank. Thus, it will be seen that the alternate triangular segments 20-1, 20-3, etc. have their apexes facing the inner circular edge 12", while the alternate triangular segments 20-2, 20-4, etc. have their apexes facing the outer circular edge 12' of the blank.

As indicated above, the blank is bent along lines 18 in alternate directions and at an obtuse angle, so that the plane of each triangular segment forms an obtuse angle with respect to that of the next succeeding one. It will be seen that the formation of such a series of obtused-angled triangular segments completely around the circular blank 12 will produce a helicoid of one convolution. The specific obtuse angle depends upon the dimension S (lead of the helix) as will be more fully described below, but usually it ranges in the order of 130°–160° in the case of a screw conveyor blade.

Figure 3:
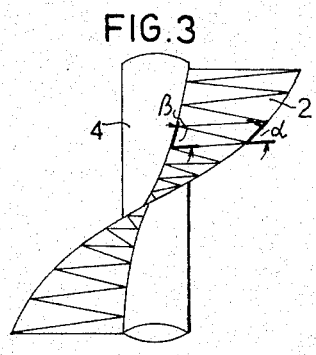
FIG. 3 illustrates a portion of the helicoidal blade produced in accordance with the present invention by the use of the sheet blank of FIG. 2.

FIG. 3 illustrates a portion of a helicoidal blade 2' so formed and fixed to its shaft 4. Steel or any other suitable material could be used for the blade.

The following specific example for producing a helicoidal screw conveyor blade will be helpful in understanding the invention and how it may be applied to produce any desired design. In the following example, the outer diameter (D) of the blade 4' is 2500 mm; the inner diameter (d) of the blade is 100 mm; The lead of the helix (S) is 500 mm; and the thickness of the blade is five-eighths inch. What have to be determined are the dimensions of the blank 12 (FIG. 2), and the obtuse angle to be formed between the planes of the consecutive triangular segments.

Figure 4:
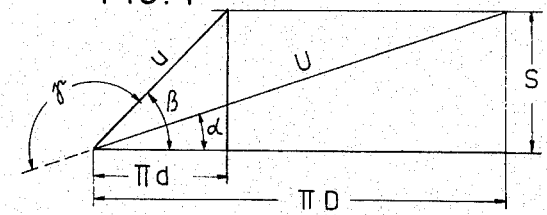
FIG. 4 is a diagram helpful in explaining the method of the present invention.

With reference to FIG. 4, which is a diagrammatic representation of the required dimensions, the dimension U (the length of the outer helical edge formed by the helicoid, i.e. edge 12' of the blank) is computed as $$U = \sqrt{2D^2 - S^2}$$

or 7921 mm. in our example. The dimension $u$ (the corresponding dimension for the inner helical edge 12") is computed as $$u = \sqrt{2d^2 - S^2}$$

or 596.1 mm. in our example.

The dimension $b$ of the blank (FIG. 2) is equal to $(D-d)2$, or 1200 mm; the dimension $r$ is equal to $bu/(U-u)$, or 97.9 mm: the dimension R is equal to $r-b$, or 1297.9 mm.

The obtuse angle between the planes of adjacent triangular segments is shown in FIG. 4 as $\gamma$. It is the complement of $\beta-\alpha$, i.e. it is equal to $180-(\beta-\alpha)$. Tangent $\alpha$ equals $S/U$, so that $\alpha$ equals 3°37'. Tangent $\beta$ equals $S/u$, so that $\beta$ equals 40°. Angle $\gamma$ can now be computed as equaling 143°37'.

While the above example relates particularly to the production of a screw conveyor blade of helicoid configuration, it will be appreciated that it could be used for making other curved sheet elements, for example rotary pump, compressor or turbine vanes. In addition, while it will be seen that obtuse angle $\gamma$ is the same for all the triangular segments, this angle may vary to produce a non-uniform curve in the sheet element. The same applies with respect to the dimensions of the triangular segments 18, which in this case are the same for the alternate ones 20-1, 20-3, etc., on the one hand, and the remaining alternate ones 20-2, 20-4, etc. on the other, although the dimensions of the two groups would be different.

Figure 5A:
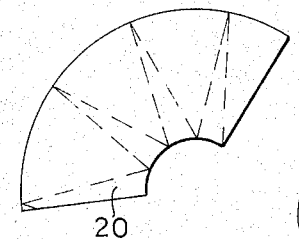
FIGS. 5a and 5b illustrate other forms of sheet blanks that may be used to produce other curved sheet elements.
Figure 5B:
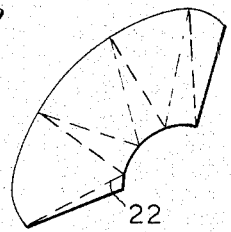

It is not necessary that the blank be in the form of a complete circular sheet, since only a part of a circular blank could be used, such as shown for example by blank 20 in FIG. 5a, in which case only a part of a convolution would be produced. In addition a non-circular blank could be used as shown at 22, in FIG. 5b.

Figure 6:
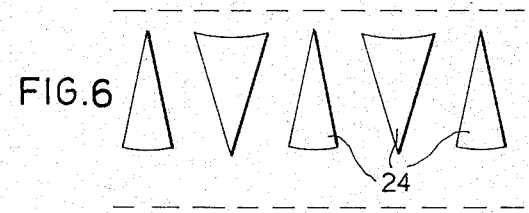
FIG. 6 illustrates a modification to the method of FIGS. 1-5.

FIG. 6 illustrates a variation in the above-described method. In this variation instead of taking a single flat sheet blank and bending it to form the series of obtuse-angled triangular segments, a plurality of separate triangular segments 24 are prepared and are fixed together (as by welding) at the obtuse angle $\gamma$ to form the curved sheet element.

It will be appreciated that the other considerations for computing the dimensions of the produced element, including the dimensions of the blanks and the angle $\gamma$, are the same in this case as described above.

Figure 7A:
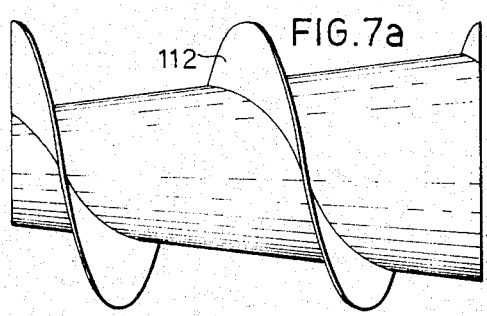
FIGS. 7a and 7b illustrate a further variation.
Figure 7B:
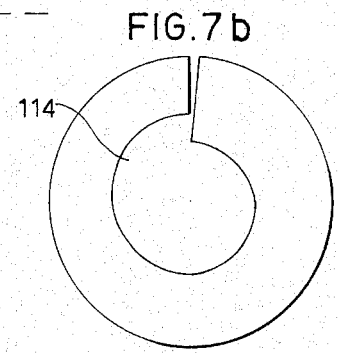

It is also not necessary that the blank or central hole be exactly circular. For example as shown in FIGS. 7a and 7b, if the central hole 114 is spiral-shaped, the inner diameter of the helicoid 12 will be of conical shape. The same applies to the outer shape of the blank which will likewise affect the outer diameter of the helicoid.

Many other modifications and applications of the invention will be apparent.

What is claimed is:

1. A method of making a rigid curved sheet element, characterized in preparing a flat sheet blank having a pair of opposed edges one of which is longer than the other, defining a longer-edge side of the blank and a shorter-edge of the blank, and bending said sheet along a plurality of lines and in alternate directions for successive lines to form a series of consecutive triangular segments bounded along their sides and alternately disposed so that their apexes alternate from the longer-edge side of the blank to the shorter-edge side of the blank, said triangular segments being so bent that each forms an obtuse angle with respect to that of the next succeeding one.

2. The method as defined in claim 1, wherein said flat sheet blank is substantially in the shape of a circle and includes a substantially circular central opening.

3. The method as defined in claim 1, wherein said sheet is curved by said series of obtused-angled triangular segments to form a helicoid.

4. The method as defined in claim 1, wherein said obtuse angle is the same between all the triangular segments; the dimensions of the triangular segments whose apexes face the shorter-edge side of the blank are all the same; and the dimensions of the triangular segments whose apexes face the longer-edge side of the blank are all the same.

* * * * *